United States Patent [19]

Rivera et al.

[11] Patent Number: 5,216,064
[45] Date of Patent: Jun. 1, 1993

[54] ROSIN-BASED RESIN-FORTIFIED EMULSION POLYMERS

[75] Inventors: Maria A. Rivera, Jacksonville, Fla.; Paul J. Zuraw, Mt. Pleasant, S.C.

[73] Assignee: Westvaco Corporation, New York, N.Y.

[21] Appl. No.: 868,670

[22] Filed: Apr. 15, 1992

[51] Int. Cl.⁵ .......................... C08J 3/02; C08L 93/04
[52] U.S. Cl. .................................. 524/457; 524/458; 524/460; 524/270; 524/272
[58] Field of Search .............. 524/457, 458, 460, 270, 524/272

[56] References Cited

U.S. PATENT DOCUMENTS

| | | |
|---|---|---|
| 2,994,635 | 8/1961 | Reaville et al. .................. 162/179 |
| 4,018,732 | 4/1977 | Lakshmanan ...................... 524/272 |
| 4,529,787 | 7/1985 | Schmidt et al. .................... 526/317 |
| 4,820,762 | 4/1989 | Tsaur .................................. 524/460 |
| 4,839,413 | 6/1989 | Kiehlbauch et al. .............. 524/460 |
| 4,939,190 | 7/1990 | Tomioka et al. ................... 524/458 |
| 4,954,558 | 9/1990 | Tsaur .................................. 525/460 |

*Primary Examiner*—Thurman K. Page
*Assistant Examiner*—LaVonda DeWitt
*Attorney, Agent, or Firm*—Daniel B. Reece, IV; Terry B. McDaniel; Richard L. Schmalz

[57] ABSTRACT

The invention relates to rosin-based resin-fortified emulsion polymer compositions having improved properties which are useful in formulating printing inks. Additionally, the invention relates to the method of preparing these emulsion polymer compositions.

13 Claims, No Drawings

ROSIN-BASED RESIN-FORTIFIED EMULSION POLYMERS

FIELD OF INVENTION

The invention relates to rosin-based resin-fortified emulsion polymer compositions having improved properties which are useful in formulating printing inks and other coatings. Additionally, the invention relates to the method of preparing these emulsion polymer compositions.

BACKGROUND OF THE INVENTION

Acrylic latices used in the production of printing inks often contain what is called a support resin. These water and alkaline soluble (at pHs about 8) resins are added to the emulsion polymerization reaction to improve the stability and rheological properties of the latex. Improved stability results from adsorption of the resin on the surface of the particles and the increased viscosity of the emulsion.

High molecular weight emulsion polymers are widely used in the coatings industry. However, several problems are associated with high molecular weight emulsion polymer technology, including: poor wetting of metal substrates, cratering of resulting films, low gloss or mudcaking of resulting films, wetting and adherency problems, mechanical instability, freeze-thaw instability, shear thinning, and poor physical properties of the resulting film. U.S. Pat. No. 4,839,413 (which is hereby incorporated by reference) attempts to address and overcome these problems by employing hard acrylic resins as support resins.

Such hard acrylic resins have become the support resins most commonly used by the ink industry. However, as these resins are relatively expensive, ink formulators are actively searching for low cost alternatives. Therefore, it is the object of this invention to utilize low cost alkali-soluble support resins to produce emulsion polymer compositions with improved mechanical and physical properties.

SUMMARY OF THE INVENTION

The object of this invention is met by the development of rosin-based support resins for use in producing emulsion polymer compositions. These resins are produced from rosin fortified via a Diels-Alder reaction with fuaric acid or maleic anhydride (or a combination of the two), followed by esterification of the fortified rosin with a polyol or a combination of polyols. The rosin-based resins are subsequently used as support resins in emulsion polymerization reactions with a monomer or combination of monomers to produce emulsion polymer compositions useful in formulating a variety of printing inks and other coatings.

Not only are rosin support resins less expensive than traditional acrylic support resins, but the rosin resins have other advantages as well. It has been found that rosin supported latices show a substantial improvement in ink gloss when compared to acrylic supported latices. Also, rosin resin fortified emulsion polymers can be used at higher solids content levels than acrylic fortified emulsion polymers at similar viscosities. This is important because it allows the formulation of higher solids inks, which dry faster than lower solids inks. A further advantage is the elimination of the residual glycol that is present in most acrylic support resins. Acrylic resins typically contain up to 8% residual glycol ether solvent, which is considered undesirable for environmental reasons.

As mentioned, the invention is directed to rosin-based resin-fortified emulsion polymer compositions and the process for preparing the same. In addition, the invention is also directed to ink formulations containing such emulsion polymers.

DESCRIPTION OF THE PREFERRED EMBODIMENT

The rosin-based support resins are produced by the fortification of rosin followed by esterification with a polyol or a combination of polyols. Rosins which are suitable for use in the reaction include, but are not limited to, the following:

wood rosin,
tall oil rosin, and
gum rosin.

Tall oil rosin is preferred, more preferably, fortified tall oil rosin made by reaction or mixing with the rosins varying amounts of fumaric acid, maleic anhydride, maleic acid, or combinations thereof. Fortification of rosin via a Diels-Alder reaction is well known in the art, as evidenced by U.S. Pat. No. 2,994,635 (which is hereby incorporated by reference).

Polyols which are suitable for use in esterification reaction with the fortified rosin include, but are not limited to, the following:

glycerol,
sorbitol,
pentaerythritol,
diethylene glycol,
polyethylene glycols,
styrene-allyl alcohol copolymer, and
combinations thereof.

Styrene-allyl alcohol copolymer is a hard thermoplastic, low molecular weight polymer available from the Monsanto Company. Polyethylene glycols (and mixtures thereof) which are suitable for use in the reaction have an average molecular weight in the range of 100 to 10,000.

The process for producing the desired rosin-based support resins comprises reacting in an esterification reaction from 60 to 98% by weight of fumarated rosin or maleated rosin (or a combination thereof) with from 2 to 40% by weight of a polyol or combination of polyols. Preferably, the rosin is reacted with sufficient fumaric acid (or maleic anhydride) to consume the available abietic-type isomers. The abietic-type isomers are known chain stoppers in free radical polymerization reactions.

The acid number of the rosin-based support resin affects the properties of the emulsion polymer. A suitable acid number for a rosin-based support resin is in the range of about 120 to 250, with the preferred range being 150 to 200.

The rosin-based support resins are added to emulsion polymerization reactions to produce emulsion polymers (which are, in turn, utilized to formulate printing inks). An emulsion polymer is a high molecular weight polymer finely dispersed in water in the form of a particle. Such polymers are formed by the polymerization of one or more monomers capable of undergoing free radical emulsion polymerization. The procedures for producing emulsion polymers are well known to those skilled in the art (as evidenced by U.S. Pat. No. 4,839,413). Furthermore, it is well within the expertise of a skilled artisan to adjust the emulsion polymerization process in order to produce an emulsion polymer with desired characteristics. The average molecular weight of polymers prepared using emulsion polymerization is usually greater than polymers made using solution or bulk polymerization methods. Typically, emulsion polymers have an average molecular weight in the range of 200,000 to 1,000,000.

In practicing the present invention, it is preferable to add the rosin-based support resin to the emulsion polymerization reaction mixture prior to initiation of the polymerization. The resin can be added as a solid, a solution, or slurry (although addition of a resin as a solution is preferred). The monomers employed in the emulsion polymerization reaction can be added to the reaction mixture in either a single stage addition or in a multi-stage addition.

In conducting the present emulsion polymerization reaction known emulsion polymerization techniques may be employed. Also, standard anionic and nonionic surfactants are utilized in the polymerization reaction as needed to prevent coagulation of the emulsion particles. Preferably, the reaction is conducted at an elevated temperature of from about 60° to 100° C., at ambient pressure and under an inert atmosphere such as nitrogen. The reaction mixture is maintained under agitation employing standard mixing techniques.

The monomers employed in the preparation of the present emulsion polymers are any monomers used in emulsion polymerization reactions. Suitable monomers include ethylenically unsaturated monomers such as olefins, mono vinylidene aromatics, alpha, beta-ethylenically unsaturated carboxylic acids and esters thereof, ethylenically unsaturated dicarboxylic anhydrides and halo substituted olefinics. Further suitable monomers include, but are not limited to, the following: styrene, alpha methylstyrene, acrylic acid, methacrylic acid, methyl methacrylate, butyl methacrylate, butyl acrylate, 2-ethylhexyl acrylate, ethyl acrylate, hydroxyethyl acrylate, and hydroxyethyl methacrylate.

The pH at which these emulsion polymers are prepared effects their stability. The suitable pH range for use in the polymerization reactions is from about 7.5 to 10.0, with the preferred range being 8.0 to 9.0.

As appreciated in the art, the exact components and properties of components desired for any given ink application can vary, and, therefore, routine experimentation may be required to determine the optional components and proportions of components for a given application and desired properties.

The following examples are provided to further illustrate the present invention and are not to be construed as limiting the invention in any manner.

EXAMPLE 1

Using different polyols, a series of five rosin-based support resins were formulated via the following procedure. All formulae and procedures are given in parts by weight of reactants. Rosin SS (100 parts) was melted in a 1000 ml three-neck round bottom flask. (Rosin SS is a tall oil rosin manufactured by Westvaco, Inc.) The flask was equipped with a Dean Stark trap, condenser, nitrogen inlet, thermocouple, heating mantle, and heating tape. Fumaric acid (26 parts) was added to the molten rosin at 150° C., and this mixture was heated to 200° C. and stirred for three hours. The respective amount of polyol (or polyols) to be evaluated (see Table I below) was slowly added to the rosin. The resulting mixture was stirred for three hours at 200° C. before cooling and collecting the resin.

TABLE I

| Resin No. | Rosin-Based Support Resins | | | Acid No. | S.P.[2] °C. |
|---|---|---|---|---|---|
| | Composition | | | | |
| | DEG | TEG | GLY | | |
| 1 | — | 10.0 | 7.0 | 165 | 129 |
| 2 | — | 10.0 | 7.0 | 165 | 129 |
| 3 | — | 20.0 | — | 171 | 107 |
| 4 | — | — | 9.5 | 174 | 145 |
| 5 | 7.5 | 4.5 | — | 182 | 138 |

[1]DEG = Diethylene glycol.
TEG = Triethylene glycol.
GLY = Glycerol.
[2]S.P. = Softening point in °C.

Emulsion polymer compositions were produced from each of the rosin-based support resins listed in Table I above via the following procedure. The alkali soluble rosin-resin (78 g) was combined with 329 g of deionized (DI) water in a blender. The resin was ground in the water and subsequently neutralized with the addition of ammonium hydroxide. The solution was neutralized to a pH of 8.5 to 9.5 and adjusted to 16.8% solids.

This alkaline solution was added to a 2-liter four-neck distilling flask equipped with a mechanical stirrer set at 15% of maximum speed, thermocouple, data plate, heating mantle, nitrogen inlet, and an additional funnel or a FMI pump. The surfactant system consisting of 26 g of Alipal CO-436 (an anionic surfactant manufactured by GAF, Inc.), 21 g of Igepal CA-897 (a nonionic surfactant manufactured by GAF, Inc.) and 8.2 g of diethylene glycol was added over a period of five minutes. The pH was checked and adjusted to 8.5–9.5 where necessary with ammonium hydroxide.

The mixtures containing Resins 2, 3, and 4 were heated to 71° C., and the first portion of the ammonium persulfate (APS) initiator was added (1.6 g APS in 4.2 g DI water). The temperature of the reaction mixture increased to 75° C. The monomers (285 g styrene and 15 g butyl acrylate) were added over 90 minutes and the temperature held between 80° C.–83° C. When half of the monomers had been added, a second portion of APS was added (1.6 g APS in 4.2 g DI water). After the monomers addition was complete, 0.3 g APS in 3 g of DI water was added. The reaction mixture was held at 80°–83° C. for an additional 30 minutes to form the emulsion polymer composition.

The same procedure was followed in the formulation utilizing Resin 1 except that the APS initiator was added in four portions (0.8 g APS in 2.1 g DI water) at 45 minute intervals. Likewise, the same procedure was followed with the Resin 5 formulation except that 26% of the APS initiator was precharged (about 0.8 g APS in 2.1 g DI water), with the remainder of the APS (2.4 g) being metered into the reaction over a period of 120 minutes.

Rosin-resin 1 (Table I) was employed via the above procedure to produce Emulsion 1, Resin 2 to formulate Emulsion 2, and so on (see Table II). These five emulsions were evaluated using Jonrez E-2002 as the control. Jonrez E-2002 (a copolymer prepared with an acrylic-based support resin manufactured by Westvaco, Inc.) is commonly used in the ink industry.

TABLE II

| Emulsion No. | pH | Film Appearance Color | Solids % | Film Appearance |
|---|---|---|---|---|
| Control | 8.6 | White | 50 | Transparent |
| 1 | 8.9 | Lt. Beige | 50 | Opaque |
| 2 | 7.5 | Beige | 36 | Transparent |
| 3 | 8.9 | Lt. Beige | 34 | Transparent |
| 4 | 7.6 | Lt. Beige | 38 | Transparent |
| 5 | 8.2 | Lt. Beige | 34 | Transparent |

Transparent, brittle films similar to the Jonrez E-2002 control were obtained with Resins 2, 3, 4, and 5.

EXAMPLE 2

A rosin-based support resin was produced via the following procedure. All formulae and procedures are given in parts by weight of reactants. Rosin SS (100 parts) was melted in a 1000 ml three-neck round bottom flask. The flask was equipped with a Dean Stark trap, condenser, nitrogen inlet, thermocouple, heating mantle, and heating tape. Fumaric acid (26 parts) was added to the molten rosin at 150° C., and this mixture was heated to 200° C. and stirred for three hours. At this time diethylene glycol (7.5 parts) and glycerol (4.5 parts) were slowly added to the rosin, and the resulting mixture was stirred for three hours at 200° C. before cooling and collecting the resin.

The rosin-based support resin was used to formulate a series of emulsion polymers for evaluation. The alkali soluble rosin-resin (78 g) was combined with 329 g of deionized (DI) water in a blender. The resin was ground in the water and subsequently neutralized with the addition of ammonium hydroxide. The solution was neutralized to a pH of 8.5 to 9.5 and to 16.8% solids.

This alkali solution was added to a 2-liter four-neck distilling flask equipped with a mechanical stirrer set at 15% of maximum speed, thermocouple, data plate, heating mantle, nitrogen inlet, and an additional funnel or a FMI pump. The surfactant system consisting of 26 g Alipal CO-436, 21 g Igepal CA-897, and 8.2 g of diethylene glycol was added over a period of five minutes. The pH was checked and adjusted to 8.5-9.5 where necessary with ammonium hydroxide.

The emulsions in Table III were prepared with the same amount of APS initiator based on monomer (1.2%). However, the amount of initiator precharged and co-charged, and the time used to co-feed the initiator (listed in Table III below) was varied for each emulsion. The monomers (285 g styrene and 15 g butyl acrylate) were added over 90 minutes and the temperature of the mixtures held between 80° C.-83° C. The various reaction mixtures were heated to a temperature between 70°-85° C. for about 3 hours to form the emulsion polymers compositions.

TABLE III

| Emulsion No. | pH | Ammonium Persulfate Initiator Addition Initiator % Precharge | Time (min) | Solids % | Film Appearance |
|---|---|---|---|---|---|
| 6 | 8.7 | 14 | 120 | 43 | Opaque |
| 7 | 8.6 | 17 | 120 | 43 | Opaque |
| 8 | 7.8 | 26 | 120 | 44 | Sl. Opaque |
| 9 | 7.5 | 26 | 87 | 45 | Transparent |
| 10 | 8.2 | 43 | 120 | 44 | Transparent |
| 11 | 8.6 | 50 | * | 45 | Opaque |

* In formulating Emulsion 11, 50% of the APS initiator was precharged and the remainder added in a single portion after half the monomer had been charged.

Nonfilm-forming emulsions at 44% solids were obtained when 43% of the initiator was precharged and the remainder added over 120 minutes. At lower precharge amounts, opaque films formed. For example, at 26% precharge, a slightly opaque film formed, and at lower levels, the opacity increased. The time of co-feed addition also affected the film appearance. For example, a clear brittle film was obtained at the 26% precharge level when the addition time for the remaining initiator was decreased.

EXAMPLE 3

A rosin-based support resin was produced using the following procedure. All formulae and procedures are given in parts by weight of reactants. Rosin SS (25 parts) and gum rosin (75 parts) were melted in a 1000 ml three-neck round bottom flask. The flask was equipped with a Dean Stark trap, condenser, nitrogen inlet, thermocouple, heating mantle, and heating tape. Fumaric acid (29 parts) was added to the molten rosin mixture at 150° C., and this mixture was heated to 200° C. and stirred for three hours. At this time glycerol (6 parts) and sorbitol (4 parts) were slowly added to the rosin, and the resulting mixture was stirred for three hours at 200° C. before cooling and collecting the resin.

This rosin-based support resin was used to formulate a series of emulsion polymers for evaluation. The alkali soluble rosin-resin (78 g) was combined with 329 g of deionized (DI) water in a blender. The resin was ground in the water and subsequently neutralized with the addition of ammonium hydroxide. The solution was neutralized to a pH of 8.5 to 9.5 and adjusted to 16.8% solids.

This alkali solution was added to a 2-liter four-neck distilling flask equipped with a mechanical stirrer set at 15% of maximum speed, thermocouple, data plate, heating mantle, nitrogen inlet, and an additional funnel a FMI pump. The surfactant system consisting of 26 g Alipal CO-436, 21 g Igepal CA-897, and 8.2 g of diethylene glycol was added over a period of five minutes. The pH was checked and adjusted to 8.5-9.5 where necessary with ammonium hydroxide.

The emulsions in Table IV were prepared with the same amount of APS initiator based on monomer (1.2%). However, the amount of initiator precharged and co-charged, and the time used to co-feed the initiator (listed in Table IV below) was varied for each emulsion. The monomers (285 g styrene and 15 g butyl acrylate) were added over 90 minutes and the temperature of the mixtures held between 80° C.-83° C. The various reaction mixtures were heated to a temperature between 70°-85° C. for about 3 hours to form the emulsion polymers compositions.

TABLE IV

Emulsions Prepared With Gum Rosin Support Resin

| Emulsion No. | pH | APS Initiator % Precharge | Time (min) | Solids % | Film Appearance |
|---|---|---|---|---|---|
| 12 | 8.5 | 26 | 120 | 50 | Transparent |
| 13 | 8.2 | 50 | * | 51 | Sl. Opaque |
| 14 | 8.3 | 7 | 120 | 50 | Transparent |
| 15 | 9.0 | 24 | 120 | 50 | Transparent |
| 16 | 9.0 | 50 | * | 50 | Transparent |
| 17 | 9.2 | 100 | 0 | 50 | Transparent |

* In formulating Emulsions 13 and 16, 50% of the APS initiator was precharged and the remainder added in a single portion after half the monomer has been charged.

As shown above, excellent results were obtained over a range of pH values and initiator additions by utilizing a gum rosin-based support resin.

EXAMPLE 4

A rosin-based support resin was produced using the following procedure. All formulae and procedures are given in parts by weight of reactants. Rosin SS (100 parts) was melted in a 1000 ml three-neck round bottom flask. The flask was equipped with a Dean Stark trap, condenser, nitrogen inlet, thermocouple, heating mantle, and heating tape. Fumaric acid (26 parts) was added to the molten rosin at 150° C., and this mixture was heated to 200° C. and stirred for three hours. At this time glycerol (6.5 parts) and sorbitol (6.5 parts) were slowly added to the rosin, and the resulting mixture was stirred for three hours at 200° C. before cooling and collecting the resin.

Various amounts of this rosin-based support resin were used to produce a series of emulsion polymers via the procedure taught in Examples 1, 2, and 3 above. The different formulations are listed in Table V below.

TABLE V

| Emulsion Number | Styrene* | BA* | Igepal* CA-897 | DEG* | Alipal* | Rosin* Resin | pH |
|---|---|---|---|---|---|---|---|
| 18 | 95 | 5 | 3.6 | 2.7 | 12 | 20 | 8.5 |
| 19 | 95 | 5 | 3.6 | 2.7 | 12 | 30 | 8.5 |
| 20 | 95 | 5 | 3.6 | 2.7 | 17 | 25 | 8.5 |
| 21 | 95 | 5 | 3.6 | 2.7 | 17 | 20 | 9.3 |

*In parts by weight.
BA = Butyl acrylate.
DEG = Diethylene glycol.

The properties of the four emulsion polymers were evaluated and the results listed in Table VI below.

TABLE VI

Properties of the Emulsion Polymers

| Emulsion | | Brookfield[1] Viscosity (cps) | Particle Size (nm) | Film Appearance[2] | | | Varnish Appearance[5] | | |
|---|---|---|---|---|---|---|---|---|---|
| No. | Final pH | % Solids | | | Opacity[3] Index | Gloss[4] White | Black | Opacity Index | Gloss White | Black |
| 18 | 7.9 | 49.7 | 120 | 79.7 | 13 | 29 | 38 | 2.5 | 48 | 63 |
| 19 | 7.9 | 50.0 | 110 | 91.6 | 14 | 38 | 44 | 2.6 | 52 | 67 |
| 20 | 7.9 | 49.8 | 90 | 105.5 | 15 | 40 | 50 | 3.0 | 45 | 65 |
| 21 | 8.6 | 49.5 | 70 | 91.6 | 14 | 35 | 40 | 2.4 | 49 | 67 |

[1]The viscosity was measured with a Brookfield model RV viscometer. It was equipped with a number 4 spindle and run at 100 rpm. The samples were placed in 8 oz. jars and equilibrated to 24.8–25.2° C. prior to measuring the viscosity.
[2]Films of the emulsions were drawn down by hand using a RDS 07 rod on Leneta chart N2A.
[3]The opacity was determined using the opacity index of the Macbeth Color-Eye spectrocolorimeter.
[4]Gloss was measured on both the white and black portions of the Lenata chart at 60°.
[5]Varnishes were prepared by blending the emulsions in a 1:1 weight ratio with Joncryl 74F (an emulsion polymer manufactured by S. C. Johnson & Son). Films of the varnishes were cast on Leneta chart N2A. The gloss was measured at 60° and the opacity measured using the Macbeth spectrocolorimeter.

As the above results indicate, the emulsions produced varnishes with good gloss and clarity.

EXAMPLE 5

Three rosin-based support resins were produced using the following procedure. All formulae and procedures are given in parts by weight of reactants. Rosin SS (100 parts) was melted in a 1000 ml three-neck round bottom flask. The flask was equipped with a Dean Stark trap, condenser, nitrogen inlet, thermocouple, heating mantle, and heating tape. Fumaric acid (24 parts) was added to the molten rosin at 150° C., and this mixture was heated to 200° C. and stirred for three hours. At this time different amounts of glycerol were slowly added to the rosin (Table VI). The resulting mixtures were stirred for three hours at 200° C. before cooling and collecting the resins.

TABLE VII

Rosin Resins Made with Glycerol

| Resin No. | Parts of Glycerol | Acid No. | Softening Point (°C.) |
|---|---|---|---|
| A | 7.5 | 203 | 141 |
| B | 9.4 | 189 | 143 |
| C | 10.8 | 173 | 149 |

TABLE VIII

Acrylate Emulsion Polymers Made with Rosin Support Resins

| Resin No. | Emulsion No. | pH Initial | pH Final | Solid % | Viscosity (cps) | Grit |
|---|---|---|---|---|---|---|
| A | A-1 | 9.0 | 8.9 | 51 | 60 | No |
|   | A-2 | 8.5 | 8.0 | 51 | 86 | No |
| B | B-1 | 9.1 | 8.4 | 52 | 100 | No |
|   | B-2 | 8.5 | 8.4 | 52 | 120 | No |
| C | C-1 | 9.1 | 8.4 | 52 | 120 | No |
|   | C-2 | 8.5 | 7.6 | 53 | 140 | Yes |

Good results were achieved using alkali-soluble rosin resins made with different levels of glycerol as support resins.

EXAMPLE 6

A rosin-based support resin was produced via the following procedure. All formulae and procedures are given in parts by weight of reactants. Rosin SS (100 parts) was melted in a 1000 ml three-neck round bottom flask. The flask was equipped with a Dean Stark trap, condenser, nitrogen inlet, thermocouple, heating mantle, and heating tape. Fumaric acid (26 parts) was added to the molten rosin at 150° C., and this mixture was heated to 200° C. and stirred for three hours. At this time diethylene glycol (7.5 parts) and glycerol (4.5 parts) were slowly added to the rosin, and the resulting mixture was stirred for three hours at 200° C. before cooling and collecting the resin.

Using the following procedure a series of seven emulsion polymer compositions were produced wherein the amounts of monomers (styrene and butyl acrylate) utilized were varied. To a 2-liter four-neck distilling flask equipped with a mechanical stirrer was added 23 parts of rosin support resin dissolved in 132 parts DI water. The pH of this resin solution was set at about 8.5 with the required amount of ammonium hydroxide. To the resin mixture was added 5 parts of a sulfated alkylphenoxypoly(ethyleneoxy) ethanol surfactant in 11.7 parts water, and 3 parts octylphenoxypoly(ethyleneoxy)ethanol surfactant in 1.3 parts water. This mixture was heated under a nitrogen blanket to 85° C.

Ten percent of the monomer blend indicated in Table IX was added to the flask, followed by the addition of 0.44 parts ammonium persulfate in 1.3 parts DI water. This initial charge of monomer was allowed to react for 30 minutes. Addition of the remaining monomer was then started and added over 120 minutes. An additional 0.44 parts ammonium persulfate in 1.3 parts water was added 60 minutes into the addition of the remaining monomer. When the monomer was completely added the emulsion was held at 85° C. for 30 minutes and then 0.13 parts ammonium persulfate was added. The emulsion was stirred for 120 minutes at 85° C. before being cooled and filtered. The final pH was adjusted to 8.3–8.4 with the required amount of ammonium hydroxide.

Each of the resins listed in Table IX was prepared following the above procedure except for Resin No. 27 (which differs only in that a two stage monomer addition was used). In Resin No. 27, 42 parts of styrene was added followed by a blend of 28 parts of styrene and 30 parts of butyl acrylate to produce core-shell latex particles.

TABLE IX

| Rosin Resin-Supported Emulsions | | | | | | |
|---|---|---|---|---|---|---|
| Emulsion No. | Styrene | BA[1] | pH | Solids % | Viscosity[2] (cps) | Film Forming | $T_g$ °C.[3] |
| 22 | 95.0 | 5.0 | 8.3 | 49.8 | 70.5 | no | 89 |
| 23 | 86.0 | 14.0 | 8.3 | 48.7 | 73.0 | no | 73 |
| 24 | 73.5 | 26.5 | 8.4 | 49.2 | 80.0 | no | 56 |
| 25 | 62.0 | 38.0 | 8.3 | 48.8 | 51.0 | yes | 36 |
| 26 | 53.0 | 47.0 | 8.3 | 47.8 | 44.5 | yes | 22 |
| 27 | 70.0 | 30.0 | 8.3 | 47.4 | 63.6 | yes | 21 |

[1] Butyl acrylate.
[2] Measured by a Brookfield model RV viscometer.
[3] Glass transition temperature in °C.

Many modifications and variations of the present invention will be apparent to one of ordinary skill in the art in light of the above teachings. It is therefore understood that the scope of the invention is not to be limited by the foregoing description, but rather it is to be defined by the claims appended hereto:

What is claimed is:

1. A method for the production of polymer emulsion products having pH values in the range of 7.5 to 10.0, which comprises reacting in a esterification reaction:

(A) 60.0 to 98.0% by weight of a member selected from the group consisting of fumarated rosin, maleated rosin, and combinations thereof, and
   (B) 2.0 to 40.0% by weight of a polyol to produce a rosin-based support resin having an acid number in the range of 120 to 250; and further reacting in a polymerization reaction:
   (1) 46.0 to 93.8% by weight of a monomer,
   (2) 0.2 to 2.0% by weight of an initiator,
   (3) 5.0 to 40.0% by weight of said support resin, and
   (4) 1.0 to 12.0% by weight of a surfactant to produce the polymer emulsion product.

2. The method of claim 1 which comprises reacting in a esterification reaction:

(A) 75.0 to 98.0% by weight of a member selected from the group consisting of fumarated rosin, maleated rosin, and combinations thereof, and
   (B) 2.0 to 25.0% by weight of a polyol to produce a rosin-based support resin having an acid number in the range of 120 to 250; and further reacting in a polymerization reaction:
   (1) 61.0 to 87.6% by weight of a monomer,
   (2) 0.4 to 1.0% by weight of an initiator,
   (3) 10.0 to 30.0% by weight of said support resin, and
   (4) 2.0 to 8.0% by weight of a surfactant to produce the polymer emulsion product.

3. The process of claim 1 wherein the polyol is selected from the group consisting of glycerol, sorbitol, pentaerythritol, neopentyl glycol, ethylene glycol, polyethylene glycols having an average molecular weight in the range of 100–10,000, and combinations thereof.

4. The process of claim 1 wherein the acid number of the rosin-based support resin in the range of 150 to 200.

5. The process of claim 1 wherein the monomer is selected from the group consisting of styrene, alpha-methylstyrene, acrylic acid, methacrylic acid, methyl methacrylate, butyl methacrylate, butyl acrylate, 2-ethylhexyl acrylate, ethyl acrylate, hydroxyethyl acrylate, hydroxyethyl methacrylate, polyethylene glycol monomethacrylate, and combinations thereof.

6. The process of claim 1 wherein the initiator is selected from the group consisting of ammonium persulfate, potassium persulfate, sodium persulfate, and combinations thereof.

7. The process of claim 1 wherein the surfactant is selected from the group consisting of sulfated alkylphenoxypoly(ethyleneoxy) ethanol, octylphenoxypoly(ethyleneoxy) ethanol, diethylene glycol, and combinations thereof.

8. The process of claim 1 wherein the pH of the polymer emulsion product is in the range of 8.0 to 9.0.

9. The process of claim 2 wherein the pH of the polymer emulsion product is in the range of 8.0 to 9.0.

10. The polymer emulsion product of the process of claim 1.

11. The polymer emulsion product of the process of claim 2.

12. A water-based ink comprising the polymer emulsion product of claim 11 and a pigment dispersion.

13. A water-based ink comprising the polymer emulsion product of claim 10 and a pigment dispersion.

* * * * *